United States Patent Office 3,448,057
Patented June 3, 1969

3,448,057
CATALYST COMPOSITIONS FOR USE IN OXYCHLORINATION OF ETHYLENE
Yujiro Kosaka, Masaaki Hayata, and Yoshihiro Hisatomi, Yamaguchi-ken, Japan, assignors to Toyo Soda Manufacturing Co., Ltd., Yamaguchi-ken, Japan
No Drawing. Filed June 9, 1965, Ser. No. 462,736
Claims priority, application Japan, June 18, 1964, 39/34,555
Int. Cl. B01j 11/82
U.S. Cl. 252—440     3 Claims

ABSTRACT OF THE DISCLOSURE

A highly active cupric sulphate or sodium sulphate/cupric sulphate catalyst composition is provided herein which composition is suitable for oxychlorination of ethylene at low temperatures by reacting ethylene with hydrochloric acid and oxygen or air in the gaseous phase, the molar ratio of sodium sulphate to cupric sulphate in said sodium sulphate/cupric sulphate catalyst combination being less than 1.5.

---

The present invention relates to novel and most effective catalyst compositions which are highly active and effective for use in the oxychlorination of ethylene by means of hydrogen chloride and oxygen or air.

The particular method of oxychlorination of ethylene with which the present invention is concerned is that in which ethylene is chlorinated by addition and/or substitution, using hydrogen chloride and air or oxygen, and by the chlorine which is produced whereby ethylene chlorination is simultaneously attained.

The catalyst composition according to the present invention consists of cupric sulphate alone, or cupric sulphate and sodium sulphate adsorbed and supported on a porous carrier such as alumina, silica gel, etc.

Hitherto-known catalysts belong to a catalyst system, the main component of which is a combination of either cupric chloride or ferric chloride and alkaline metal chloride.

The activity of these already known catalysts is generally relatively low at low temperatures, so that it is necessary to conduct the reaction at a temperature range as high as 300–600° C.

The present invention is based on the finding that a non-chloridic, namely a catalyst system consisting essentially of cupric sulphate, which had hitherto been entirely unknown for the purpose in view, is particularly effective.

It was further found that even though cupric sulphate possesses an adequate activity when used alone, it develops a particularly superior catalyst activity as well as a selectivity when sodium sulphate is added to the cupric sulphate to make a compound catalyst.

The catalyst compositions of the present invention show particularly high selectivity for the production of dichloroethane even at temperatures as low as below 300° C. as shown in the following examples.

Some of the particularly notable advantages which can be gained by using the catalyst of the present invention in the reaction are:

(1) Substantially no catalyst losses take place through volatilization.
(2) Reaction temperatures can be readily controlled.
(3) Corrosion of the equipment is markedly reduced.
(4) Since the catalyst of the present invention is of high activity at lower temperatures, it is practically free from poisoning effects caused by deposited carbon and other matters, and moreover, the utilization rate of ethylene is higher because the carbonization and combustion of ethylene is practically nil.
(5) It provides a higher selectivity of desired product.
(6) It further gives higher yields within a wider temperature range.

Regarding the molar ratio of cupric sulphate to sodium sulphate in the catalyst of the present invention, the symbol R used hereinafter signifies the total number of moles of sodium sulphate/total number of moles of cupric sulphate.

The catalyst is effective in the range of $R=0$ to 1.5, the maximum activity of the catalyst being obtainable at $R=1.0$ or thereabout. In employing catalyst compositions in which R is larger, volatilization of cupric sulphate will decrease, but when R is increased beyond 1.5 a decrease in the rate of reaction is observable.

The most outstanding feature of the catalyst of the present invention is that practically no loss of cupric sulphate takes place and the selectivity and activity of the catalyst is remarkably high at low temperatures when using the catalyst in the oxychlorination reaction.

The following examples illustrate presently preferred embodiments of the oxychlorination of ethylene with the aid of the catalyst of the present invention.

EXAMPLE 1

(a) *Preparation of catalyst composition.*—0.8 mole of cupric sulphate and 0.8 mole of sodium sulphate are dissolved in distilled water, and the solution is adsorbed onto activated alumina granules. The wet catalyst mass is thereafter evaporated to dryness on a sand bath at a temperature of approximately 200° C., then the dry product is used as catalyst.

(b) *Oxychlorination of ethylene.*—The bottom part of the reaction tube, which is made of 18Cr–18Ni stainless steel, with an inside diameter of 21 millimeter is filled with about 150 milliliters of calcined silica to serve as preheating part, and the upper part of the tube is filled with 45 milliliters of the catalyst (approximately 11 centimeters high within the tube), and then the reaction is conducted.

The temperature during the reaction operation is automatically maintained at the pre-set level by an electric thermo-unit.

For the catalyst in this run, 0.8 mole of cupric sulphate and 0.8 mole of sodium sulphate supported on 1 liter of active alumina are used, and the reaction is conducted supplying the reactant gases at a flow rate of 60, 100 and 200 milliliters/minute for $C_2H_4$, HCl and air respectively. The results are shown in Table 1.

Table 1

Reaction temperature _____ ° C__ 250
Conversion of HCl _____percent__ 91.1
Composition of reaction product obtained:
   1,2-dichloroethane _____percent by weight__ 98.7
   Ethyl chloride _____do____ 0.7
   Vinyl chloride _____ ___
   Other components _____percent by weight__ 0.6

NOTE: The conversion of hydrogen chloride was determined according to the equation $$100 - \frac{(\text{unreacted hydrogen chloride}) \times 100}{(\text{hydrogen chloride supplied})} = \text{percent}$$

EXAMPLE 2

0.8 mole of cupric sulphate supported on 1 liter of activated alumina carrier was used as catalyst in this example. The other reaction conditions were the same as described in Example 1. The results of the run using this catalyst are shown in Table 2.

Table 2

| | |
|---|---|
| Reaction temperature ° C | 250 |
| Conversion of HCl percent | 77.4 |
| Composition of reaction product obtained: | |
|    1,2-dichloroethane percent by weight | 98.4 |
|    Ethyl chloride do | 0.8 |
|    Vinyl chloride do | --- |
|    Other components do | 0.8 |

EXAMPLE 3

0.8 mole of cupric sulphate and 0.4 mole of sodium sulphate supported on 1 liter of activated alumina carrier were used as catalyst in this example. The other reaction conditions were the same as described in Example 1. The results are shown in Table 3.

Table 3

| | |
|---|---|
| Reaction temperature ° C | 250 |
| Conversion of HCl percent | 88.4 |
| Composition of reaction product obtained: | |
|    1,2-dichloroethane percent by weight | 99.6 |
|    Ethyl chloride do | 0.1 |
|    Vinyl chloride do | --- |
|    Other components do | 0.3 |

EXAMPLE 4

0.8 mole of cupric sulphate and 1.2 moles of sodium sulphate supported on 1 liter of activated alumina carrier were employed in this example. The other reaction conditions were the same as described in Example 1. The results of the run using this catalyst are shown in Table 4.

Table 4

| | |
|---|---|
| Reaction temperature ° C | 250 |
| Conversion of HCl percent | 76.9 |
| Composition of reaction product obtained: | |
|    1,2-dichloroethane percent by weight | 98.9 |
|    Ethyl chloride do | 0.6 |
|    Vinyl chloride do | --- |
|    Other components do | 0.5 |

EXAMPLE 5

0.8 mole of cupric sulphate and 1.4 moles of sodium sulphate supported on 1 liter of activated alumina carrier were used as catalyst in this example. The other reaction conditions were the same as described in Example 1. The results of the run using this catalyst are shown in Table 5.

Table 5

| | |
|---|---|
| Reaction temperature ° C | 250 |
| Conversion of HCl percent | 51.3 |
| Composition of reaction product obtained: | |
|    1,2-dichloroethane percent | 98.8 |
|    Ethyl chloride do | 1.0 |
|    Vinyl chloride do | --- |
|    Other components do | 0.2 |

EXAMPLE 6

The case where silica gel was employed as carrier for the catalyst is shown by this example. 0.8 mole of cupric sulphate and 0.8 mole of sodium sulphate were supported on 1 liter of silica gel and the run was conducted under the reaction conditions as described in Example 1. The results are shown in Table 6.

Table 6

| | |
|---|---|
| Reaction temperature ° C | 250 |
| Conversion of HCl percent | 53.8 |
| Composition of reaction product obtained: | |
|    1,2-dichloroethane percent by weight | 96.2 |
|    Ethyl chloride do | 3.4 |
|    Vinyl chloride do | --- |
|    Other components do | 0.4 |

EXAMPLE 7

This example shows the case where the same catalyst as used in Example 1 was employed, but oxygen instead of air was used, employing 45 milliliters of the same catalyst as used in Example 1, and conducting the reaction with the reactant gases supplied at the rate of 60 milliliters/minute of $C_2H_4$, 100 milliliters/minute of HCl and 30 milliliters/minute of $O_2$. The results are shown in the following table.

Table 7

| | |
|---|---|
| Reaction temperature ° C | 250 |
| Conversion of HCl percent | 95.0 |
| Composition of reaction product obtained: | |
|    1,2-dichloroethane percent by weight | 98.0 |
|    Ethyl chloride do | 1.1 |
|    Vinyl chloride do | 0.5 |
|    Other components do | 0.4 |

We claim:

1. A highly active catalyst composition suitable for oxychlorination of ethylene at low temperatures by reaction with HCl and oxygen or air in the gaseous phase, consisting essentially of cupric sulphate absorbed on a porous carrier.

2. A highly active sodium sulphate/cupric sulphate catalyst composition suitable for oxychlorination reaction of ethylene at low temperatures by reaction with HCl and oxygen or air in the gaseous phase, the molar ratio of sodium sulphate to cupric sulphate in the catalyst composition being less than 1.5, said catalyst composition being absorbed on a porous carrier.

3. A catalyst composition according to claim 2, wherein the said molar ratio is approximately 1:1.

References Cited

UNITED STATES PATENTS

| | | | |
|---|---|---|---|
| 2,308,489 | 1/1943 | Coss | 260—659 |
| 2,342,100 | 2/1944 | Coss | 260—659 |
| 2,379,414 | 7/1945 | Coss | 260—659 |
| 3,190,931 | 6/1965 | Laine et al. | 260—659 |
| 3,332,885 | 7/1967 | Imoto et al. | 252—440 |

FOREIGN PATENTS

| | | |
|---|---|---|
| 6,411,608 | 4/1965 | Netherlands. |

PATRICK P. GARVIN, *Primary Examiner.*

U.S. Cl. X.R.

260—663